(12) United States Patent
Li

(10) Patent No.: US 12,274,254 B2
(45) Date of Patent: Apr. 15, 2025

(54) SOLAR MOSQUITO KILLER LAMP

(71) Applicant: Meizhen Li, Guangdong (CN)

(72) Inventor: Meizhen Li, Guangdong (CN)

( * ) Notice: Subject to any disclaimer, the term of this patent is extended or adjusted under 35 U.S.C. 154(b) by 0 days.

(21) Appl. No.: 18/483,299

(22) Filed: Oct. 9, 2023

(65) Prior Publication Data

US 2025/0049019 A1 Feb. 13, 2025

Related U.S. Application Data

(63) Continuation of application No. 18/451,707, filed on Aug. 17, 2023, now abandoned.

(30) Foreign Application Priority Data

Aug. 7, 2023 (CN) .......................... 202322118211.2

(51) Int. Cl.
*A01M 1/22* (2006.01)
*A01M 1/04* (2006.01)
*F21S 9/03* (2006.01)

(52) U.S. Cl.
CPC .............. *A01M 1/223* (2013.01); *A01M 1/04* (2013.01); *F21S 9/03* (2013.01)

(58) Field of Classification Search
CPC .............................. A01M 1/223; A01M 1/04
USPC ..................................... 43/112, 113
See application file for complete search history.

(56) References Cited

U.S. PATENT DOCUMENTS

| 1,743,664 | A | * | 1/1930 | Frost | ............... A01M 1/04 |
| | | | | | 362/253 |
| 2,941,328 | A | * | 6/1960 | Streat | ............. A01M 1/223 |
| | | | | | 43/112 |
| 3,201,893 | A | * | 8/1965 | Gesmar | ............ A01M 1/08 |
| | | | | | 43/139 |
| 3,321,862 | A | * | 5/1967 | Peek | ............. A01M 1/223 |
| | | | | | 315/238 |

(Continued)

FOREIGN PATENT DOCUMENTS

| CA | 2520928 A1 * | 3/2007 | ............ A01M 1/026 |
| CN | 201034285 Y * | 3/2008 | ............. F21S 9/037 |

(Continued)

OTHER PUBLICATIONS

Merged translation of CN_201034285 (Year: 2008).*

(Continued)

*Primary Examiner* — Morgan T Jordan

(57) ABSTRACT

A solar mosquito killer lamp includes a light emitted by the LED tube in the first light-emitting unit lures mosquitoes. The lured mosquitoes are killed through a high-voltage power grid. A battery and a circuit board arranged in a mounting shell supply power to the LED tube and the high-voltage power grid. Furthermore, a solar panel module electrically connected to the battery and the circuit board is provided, and can convert sunlight into electric energy and store the electric energy into the battery. Due to the solar panel module, compared with a mosquito killer lamp that only includes a single-layer solar panel, the mosquito killer lamp with the solar panel module enlarges an area of the solar panel, thereby improving the solar energy conversion efficiency. Therefore, the mosquito killer lamp can fully use the sunlight to achieve charging during outdoor use and is conductive to reducing the energy consumption.

13 Claims, 10 Drawing Sheets

(56) References Cited

U.S. PATENT DOCUMENTS

| | | | | |
|---|---|---|---|---|
| 3,473,251 A * | 10/1969 | Kahn | A01M 1/223 | 43/112 |
| 3,986,292 A * | 10/1976 | Klebanoff | A01M 1/223 | 43/112 |
| 4,182,069 A * | 1/1980 | De Yoreo | A01M 1/04 | 43/112 |
| 4,523,404 A * | 6/1985 | DeYoreo | A01M 1/04 | 43/112 |
| 4,603,505 A * | 8/1986 | Millard | A01M 1/04 | 362/179 |
| 4,626,852 A * | 12/1986 | Dodge | B63B 51/02 | 340/331 |
| 4,785,573 A * | 11/1988 | Millard | A01M 1/04 | 362/179 |
| 4,788,789 A * | 12/1988 | Boobar | A01M 1/08 | D22/122 |
| 4,962,611 A * | 10/1990 | Millard | A01M 1/223 | 362/179 |
| 5,055,984 A * | 10/1991 | Hung | F21S 9/037 | 362/183 |
| 5,515,643 A * | 5/1996 | Lin | A01M 1/223 | 43/112 |
| 6,618,984 B1 * | 9/2003 | Li | A01M 1/223 | 43/107 |
| 7,204,618 B1 * | 4/2007 | Kuelbs | F21S 9/037 | 362/35 |
| 7,784,215 B2 * | 8/2010 | Cohnstaedt | A01M 1/04 | 362/231 |
| 8,319,649 B1 * | 11/2012 | Devane | A01M 1/026 | 340/552 |
| 8,424,239 B1 * | 4/2013 | Gallo | A01M 1/223 | 43/112 |
| 8,875,437 B1 * | 11/2014 | Xie | A01M 1/223 | 43/112 |
| 2001/0045051 A1 | 11/2001 | Miller | A01M 1/06 | 43/107 |
| 2002/0121045 A1 * | 9/2002 | Hall | A01M 1/106 | 43/107 |
| 2003/0000126 A1 * | 1/2003 | Lenz | A01M 1/04 | 43/112 |
| 2003/0192229 A1 * | 10/2003 | Wilbanks | A01M 1/223 | 43/112 |
| 2004/0006848 A1 * | 1/2004 | Hsu | F21S 9/037 | 16/367 |
| 2005/0126068 A1 * | 6/2005 | Welch | A01M 1/223 | 43/112 |
| 2005/0172542 A1 * | 8/2005 | Rose | A01M 1/145 | 43/113 |
| 2006/0021274 A1 * | 2/2006 | Chen | A01M 1/023 | 43/107 |
| 2006/0053683 A1 * | 3/2006 | Lau | A01M 1/02 | 43/112 |
| 2006/0193126 A1 * | 8/2006 | Kuelbs | F21V 33/0044 | 362/155 |
| 2007/0056207 A1 * | 3/2007 | Chen | A01M 1/026 | 43/107 |
| 2007/0107298 A1 * | 5/2007 | Miao | A01M 1/145 | 43/113 |
| 2007/0175085 A1 * | 8/2007 | Chen | A01M 1/04 | 43/112 |
| 2008/0034642 A1 * | 2/2008 | Chen | A01M 1/04 | 43/112 |
| 2008/0034643 A1 * | 2/2008 | Chen | A01M 1/04 | 43/112 |
| 2008/0090189 A1 * | 4/2008 | Lin | A01M 1/04 | 431/137 |
| 2008/0223953 A1 * | 9/2008 | Tomono | A61M 11/005 | 128/200.16 |
| 2008/0232094 A1 * | 9/2008 | Ramsdell | F21S 8/088 | 362/183 |
| 2009/0067174 A1 * | 3/2009 | Kao | A01M 29/18 | 362/253 |
| 2009/0094883 A1 * | 4/2009 | Child | A01M 1/023 | 43/112 |
| 2009/0277073 A1 * | 11/2009 | Chen | A01M 1/223 | 43/112 |
| 2010/0058646 A1 * | 3/2010 | Scholz | A01M 1/04 | 43/112 |
| 2010/0071257 A1 * | 3/2010 | Tsai | A01M 29/10 | 43/113 |
| 2010/0096000 A1 * | 4/2010 | Andrade | F21S 9/037 | 136/246 |
| 2011/0030266 A1 * | 2/2011 | Roy | A01M 1/08 | 43/113 |
| 2012/0057333 A1 * | 3/2012 | Bhardwaj | F21S 9/03 | 362/183 |
| 2012/0106142 A1 * | 5/2012 | Jensen | F21S 9/03 | 362/190 |
| 2013/0114244 A1 * | 5/2013 | Formico | F21V 33/006 | 29/469 |
| 2014/0137462 A1 * | 5/2014 | Rocha | A01M 1/023 | 43/113 |
| 2014/0165452 A1 * | 6/2014 | Rocha | A01M 1/08 | 43/139 |
| 2014/0268679 A1 * | 9/2014 | Huang | A01M 1/04 | 362/101 |
| 2014/0352200 A1 * | 12/2014 | Tremble | A01M 1/223 | 43/112 |
| 2016/0050901 A1 * | 2/2016 | Pugh | A01M 1/223 | 43/112 |
| 2017/0071184 A1 * | 3/2017 | Zheng | H05C 1/06 | |
| 2017/0094960 A1 * | 4/2017 | Sasaki | A01M 1/023 | |
| 2017/0188563 A1 * | 7/2017 | Lee | A01M 1/223 | |
| 2017/0367314 A1 * | 12/2017 | Billingsley, Jr. | H05B 47/19 | |
| 2018/0343846 A1 * | 12/2018 | Horne | A01M 1/04 | |
| 2019/0307113 A1 * | 10/2019 | Horne | A01M 1/04 | |
| 2019/0350184 A1 * | 11/2019 | Chang | A61L 9/20 | |
| 2021/0204535 A1 * | 7/2021 | Studer | F21S 4/28 | |
| 2023/0284605 A1 * | 9/2023 | Rubel | A01M 1/226 | |

FOREIGN PATENT DOCUMENTS

| | | | | |
|---|---|---|---|---|
| CN | 103478099 A | * | 1/2014 | A01M 1/04 |
| CN | 104696856 A | * | 6/2015 | |
| CN | 205040481 U | * | 2/2016 | A01M 1/04 |
| CN | 106070130 A | * | 11/2016 | |
| CN | 106106403 A | * | 11/2016 | |
| CN | 106561595 A | * | 4/2017 | |
| CN | 107197845 A | * | 9/2017 | |
| CN | 107232159 A | * | 10/2017 | A01M 1/02 |
| CN | 107439519 A | * | 12/2017 | |
| CN | 107751139 A | * | 3/2018 | A01M 1/023 |
| CN | 107853267 A | * | 3/2018 | |
| CN | 108013010 A | * | 5/2018 | A01M 1/04 |
| CN | 108522462 A | * | 9/2018 | |
| CN | 111194734 A | * | 5/2020 | |
| CN | 112273348 A | * | 1/2021 | |
| GB | 2171882 A | * | 9/1986 | A01M 1/04 |
| WO | WO-2007079619 A1 | * | 7/2007 | A01M 1/04 |

OTHER PUBLICATIONS

Merged translation of CN_103478099 (Year: 2014).*
Merged translation of CN_104696856 (Year: 2015).*
Merged translation of CN_106070130 (Year: 2016).*
Merged translation of CN_106106403 (Year: 2016).*
Merged translation of CN_205040481 (Year: 2016).*
Merged translation of CN_106561595 (Year: 2017).*
Merged translation of CN_107197845 (Year: 2017).*
Merged translation of CN_107232159 (Year: 2017).*
Merged translation of CN_107439519 (Year: 2017).*
Merged translation of CN_107751139 (Year: 2018).*
Merged translation of CN_107853267 (Year: 2018).*
Merged translation of CN_108013010 (Year: 2018).*
Merged translation of CN_108522462 (Year: 2018).*
Merged translation of CN_111194734 (Year: 2020).*
Merged translation of CN_112273348 (Year: 2021).*

(56) References Cited

OTHER PUBLICATIONS

Merged translation of CA_2520928 (Year: 2007).*
Merged translation of WO_2007079619 (Year: 2007).*

* cited by examiner

SOLAR MOSQUITO KILLER LAMP

CROSS-REFERENCE TO RELATED APPLICATIONS

This application is a continuation of the U.S. application Ser. No. 18/451,707 filed on Aug. 17, 2023, and entitled "SOLAR MOSQUITO KILLER LAMP," now pending, and also claims priority of Chinese patent application CN2023221182112, filed on Aug. 7, 2023, the entire disclosures of which are incorporated herein by reference.

TECHNICAL FIELD

The present disclosure relates to the field of mosquito killer lamps, and particularly to a solar mosquito killer lamp.

BACKGROUND

In our daily lives, mosquito killer lamps are widely used electronic products, which has many advantages compared to other mosquito products. A mosquito killer lamp neither has a pungent smell like mosquito-repellent incense and insecticides, nor causes chemical pollution, so the mosquito killer lamp is completely harmless to health. A working principle of the mosquito killer lamp is as follows: The mosquito killer lamp lures mosquitoes to get close to a light source using mosquito's tendency toward light and then kills the mosquitoes through an electric mesh around the light source. The mosquito killer lamp has unique features of silence and odorlessness, and would not cause any harm to human. At present, according to the common traditional mosquito killer lamps on the market, an energy storage battery of the mosquito killer lamp is charged by electrical plugging. However, when the mosquito killer lamp is carried for outdoor use, there is often no charging power supply and the energy storage battery may be low, such that the mosquito killer lamp cannot work for a long time. Therefore, there is an urgent need for a mosquito killer lamp on the market that can ensure normal work under an outdoor condition.

SUMMARY

In view of this, the present disclosure provides a solar mosquito killer lamp, which can charge a battery using solar energy to achieve normal outdoor operations.

The present disclosure discloses a solar mosquito killer lamp includes a first light-emitting unit. The first light-emitting unit includes a light-emitting diode (LED) tube, wherein the LED tube is configured to emit light luring mosquitoes; a mosquito killer unit includes a high-voltage power grid, wherein the high-voltage power grid is configured to kill, under a high voltage, mosquitoes lured by the LED tube; a circuit board, electrically connected to the first light-emitting unit and the mosquito killer unit and configured to supply power to the first light-emitting unit and the mosquito killer unit; a mounting shell, wherein the mounting shell is provided with a battery; the battery is electrically connected to the circuit board; the circuit board is arranged to the mounting shell; the first light-emitting unit and the mosquito killer unit are connected to the mounting shell; and a solar panel module; the solar panel module is connected to the mounting shell; and the solar panel is electrically connected to the circuit board and the battery.

As the improvement of the present disclosure, the solar panel includes a first layer of solar panel; and the first layer of solar panel is arranged on an upper end surface of the mounting shell.

As the improvement of the present disclosure, a first accommodating slot is formed in the upper end surface of the mounting shell; an upwards protruding contact is arranged on a bottom of the first accommodating slot; the first layer of solar panel is arranged in the first accommodating slot; and the first layer of solar panel is electrically connected to the battery and the circuit board through the contact.

As the improvement of the present disclosure, the mounting shell is rotatably connected with a cover body; the cover body is provided with a second accommodating slot; the solar panel includes a second layer of solar panel; the second layer of solar panel is arranged in the second accommodating slot; and the second layer of solar panel is electrically connected to the circuit board and the battery.

As the improvement of the present disclosure, the cover body includes a first cover body; the first cover body is flipped and rotated with the mounting shell through a first rotating shaft mechanism; the first rotating shaft mechanism is horizontally arranged between the first cover body and the mounting shell, and the first cover body is flipped up and down to cover the upper end face of the mounting shell through the first rotating shaft mechanism; the first cover body is provided with a third accommodating slot; the second layer of solar panel includes a first solar panel; the first solar panel is arranged in the third accommodating slot; and when the first cover body is flipped to open, the first layer of solar panel and the second layer of solar panel work simultaneously.

As the improvement of the present disclosure, the cover body includes a second cover body; the second cover body is rotatably connected to the mounting shell through a second rotating shaft mechanism; the second rotating shaft mechanism is vertically arranged between the second cover body and the mounting shell, and the second cover body slides left and right to cover the upper end face of the mounting shell through the second rotating shaft mechanism; the second cover body is provided with a fourth accommodating slot; the second layer of solar panel includes a second solar panel; the second solar panel is arranged in the fourth accommodating slot; and when the second cover body slides to rotatably open, the first layer of solar panel and the second layer of solar panel work simultaneously.

As the improvement of the present disclosure, the cover body includes a third cover body and a fourth cover body; the third cover body and the fourth cover body are respectively rotatably connected to the mounting shell through a third rotating shaft mechanism and a fourth rotating shaft mechanism; the third rotating shaft mechanism is horizontally arranged between the third cover body and the mounting shell, and the fourth rotating shaft mechanism is horizontally arranged between the fourth cover body and the mounting shell; the third cover body and the fourth cover body are respectively flipped and rotated up and down through the third rotating shaft mechanism and the fourth rotating shaft mechanism, and jointly cover the upper end face of the mounting shell; the third cover body is provided with a fifth accommodating slot; the second layer of solar panel includes a third solar panel; the third solar panel is arranged in the fifth accommodating slot; the fourth cover body is provided with a sixth accommodating slot, and the second layer of solar panel includes a fourth solar panel; the fourth solar panel is arranged in the sixth accommodating slot; and when the third cover body and the fourth cover body are flipped to open, the first layer of solar panel and the second layer of solar panel work simultaneously.

As the improvement of the present disclosure, the cover body includes a fifth cover body and a sixth cover body; the fifth cover body and the sixth cover body are rotatably connected to the mounting shell through a fifth rotating shaft mechanism; the fifth rotating shaft mechanism is vertically arranged among the fifth cover body, the sixth cover body, and the mounting shell; the fifth cover body and the sixth cover body slide left and right through the fifth rotating shaft mechanism and jointly cover the upper end face of the mounting shell; the fifth cover body is provided with a seventh accommodating slot; the second layer of solar panel includes a fifth solar panel; the fifth solar panel is arranged in the seventh accommodating slot; the sixth cover body is provided with an eighth accommodating slot, and the second layer of solar panel includes a sixth solar panel; the sixth solar panel is arranged in the eighth accommodating slot; and when the fifth cover body and the sixth cover body slide relatively to rotatably open, the first layer of solar panel and the second layer of solar panel work simultaneously.

As the improvement of the present disclosure, the LED tube includes a circuit board; the circuit board is provided with several LEDs; one end of the circuit board is connected with an electrifying device; the electrifying device is connected with a first end cover; a pin is mounted on the first end cover; the pin is electrically connected to the electrifying device; and the other end of the circuit board is connected with a second end cover.

As the improvement of the present disclosure, the LED tube further includes a scattering structure and a transparent tube body; the scattering structure and the transparent tube body enclose the circuit board; one end of the scattering structure is connected to the first end cover; the other end of the scattering structure is connected to the second end cover; one end of the transparent tube body is connected to the first end cover; and the other end of the transparent tube body is connected to the second end cover.

As the improvement of the present disclosure, the several LEDs are irregularly arranged on the circuit board; and the LEDs adopt LEDs with a wavelength of 365 to 380 nm and LEDs with a wavelength of 380 to 400 nm.

As the improvement of the present disclosure, the LED tube is detachably connected to the mounting shell; the mounting shell includes an upper shell and a base; the upper shell is provided with a first clamping slot and a first fixing member; the first fixing member is provided with a mounting hole; the pin is detachably plugged into the mounting hole; the first end cover is detachably plugged into the first clamping slot; the base is provided with a second clamping slot and a second fixing member; and the second end cover is detachably plugged into the second clamping slot through the second fixing member.

As the improvement of the present disclosure, the high-voltage power grid is arranged around the LED tube; one end of the high-voltage power grid is connected to the upper shell, and the other end of the high-voltage power grid is connected to the base; the base is provided with a killed mosquito opening and a bottom cover; the bottom cover is detachably connected to the base; when the high-voltage power grid kills mosquitoes, the mosquitoes killed by the high-voltage power grid enter and fall onto the bottom cover through the killed mosquito opening.

As the improvement of the present disclosure, the high-voltage power grid includes an inner grid and an outer grid; the inner grid and the outer grid each include a plurality of gratings; and the gratings of the inner grid and the gratings of the outer grid are staggered.

As the improvement of the present disclosure, the solar mosquito killer lamp further includes a lampshade, wherein the lampshade is a grid hollow lampshade; an upper end of the lampshade is connected to a bottom of the upper shell, and a lower end is connected to a top of the base; and the LED tube and the high-voltage power grid are both arranged in the lampshade.

As the improvement of the present disclosure, the upper shell is provided with an accommodating cavity; and the circuit board and the battery are both arranged in the accommodating cavity.

As the improvement of the present disclosure, the solar mosquito killer lamp further includes a second light-emitting unit, wherein the second light-emitting unit includes several LEDs; the LEDs are uniformly arranged around a periphery of the upper shell; the upper shell is further provided with a transparent cover body; and the transparent cover body covers the LEDs.

As the improvement of the present disclosure, a first stepless adjustment knob, a second stepless adjustment knob, and a switch are arranged on an outer surface of the upper shell; the first stepless adjustment knob is configured to adjust brightness of the LEDs; the second stepless adjustment knob is configured to adjust a wavelength of the LED tube; and the switch is configured to control the mosquito killer lamp to be turned on or turned off.

As the improvement of the present disclosure, the upper shell is further provided with a charging port; and the charging port is electrically connected to the circuit board and is configured to connect an external power supply.

As the improvement of the present disclosure, the mosquito killer lamp further includes a handle portion; the handle portion is rotatably connected to the mounting shell; and the handle portion is configured to carry the mosquito killer lamp.

Beneficial effects: the present disclosure discloses a light emitted by the LED tube in the first light-emitting unit lures mosquitoes, and the lured mosquitoes are killed through the high-voltage power grid. The battery and the circuit board which are arranged in the mounting shell supply power to the LED tube and the high-voltage power grid. Furthermore, the solar panel module electrically connected to the battery and the circuit board is provided, and can convert the sunlight into electric energy and store the electric energy into the battery. Due to the solar panel module with two or more solar panels, compared with a mosquito killer lamp that only includes a single-layer solar panel, the mosquito killer lamp with the the solar panel module enlarges an area of the solar panel, thereby improving the solar energy conversion efficiency. Therefore, the mosquito killer lamp can fully use the sunlight to achieve charging during outdoor use, and is conductive to reducing the energy consumption and the environmental pollution.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

Figure 1:
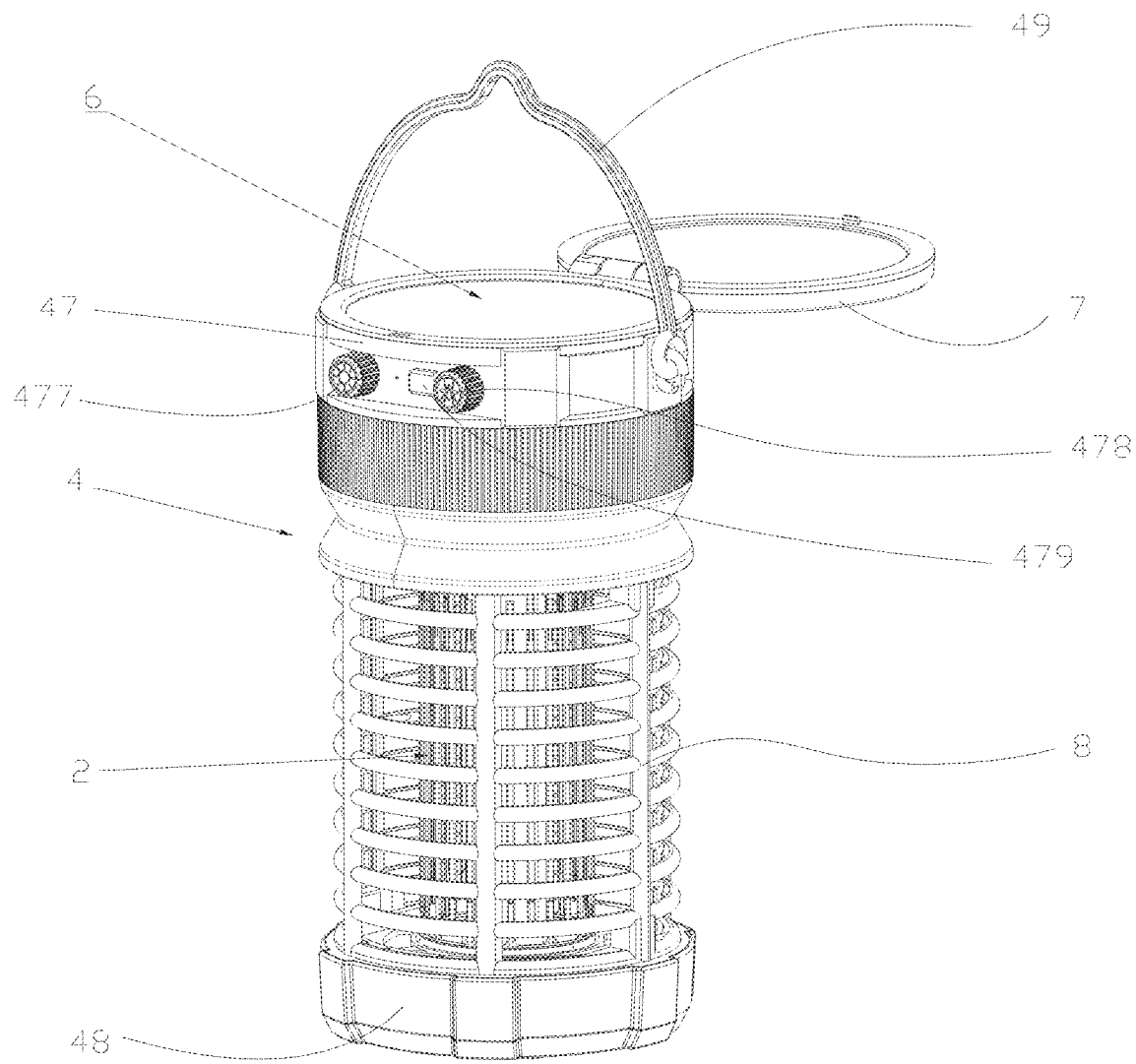
FIG. 1 is an overall structural diagram of a mosquito killer lamp of the present disclosure.

The terms "first", "second", "first", and the like in the specification and claims of the present disclosure and the above drawings are used to distinguish similar objects, and are not intended to describe a specific sequence. In addition, the terms "include" and any variations thereof mean covering and non-exclusive inclusion. For example, processes, methods, systems, products, or devices which include a series of steps or units are not limited to listed steps or units, but selectively further include steps or units which are not listed, or selectively further include other steps or units which are inherent to these processes, methods, products, or devices.

Referring to FIG. 1 to FIG. 6, a solar mosquito killer lamp includes a first light-emitting unit 1, wherein the first light-emitting unit 1 includes an LED tube 11, and the LED tube 11 is configured to emit light luring mosquitoes; a mosquito killer unit 2, including a high-voltage power grid 21, wherein the high-voltage power grid 21 is configured to kill, under a high voltage, mosquitoes lured by the LED tube 11; a circuit board 3, electrically connected to the first light-emitting unit 1 and the mosquito killer unit 2 and configured to supply power to the first light-emitting unit 1 and the mosquito killer unit 2; a mounting shell 4, wherein the mounting shell 4 is provided with a battery 5; the battery 5 is electrically connected to the circuit board 3; the circuit board 3 is arranged to the mounting shell 4; the first light-emitting unit 1 and the mosquito killer unit 2 are connected to the mounting shell 4; and a solar panel 6, wherein the solar panel 6 is a two layer solar panel module 6; the solar panel 6 is connected to the mounting shell 4; and the solar panel 6 is electrically connected to the circuit board 3 and the battery 5. By means of the above structure, the light emitted by the LED tube 11 in the first light-emitting unit 1 lures mosquitoes, and the lured mosquitoes are killed through the high-voltage power grid 21. The battery 5 and the circuit board 3 which are arranged in the mounting shell 4 supply power to the LED tube 11 and the high-voltage power grid 21. Furthermore, the solar panel module 6 electrically connected to the battery 5 and the circuit board 3 is provided, and can convert the sunlight into electric energy and store the electric energy into the battery 5. Due to the solar panel module 6, compared with a mosquito killer lamp that only includes a single-layer solar panel, the mosquito killer lamp with the two-layer design enlarges an area of the solar panel 6, thereby improving the solar energy conversion efficiency. Therefore, the mosquito killer lamp can fully use the sunlight to achieve charging during outdoor use, and is conductive to reducing the energy consumption and the environmental pollution.

In this embodiment, the solar panel 6 includes a first layer of solar panel 61; and the first layer of solar panel 61 is arranged on an upper end surface of the mounting shell 4. A first accommodating slot 41 is formed in the upper end surface of the mounting shell 4; an upwards protruding contact 411 is arranged on a bottom of the first accommodating slot 41; the first layer of solar panel 61 is arranged in the first accommodating slot 41; and the first layer of solar panel 61 is electrically connected to the battery 5 and the circuit board 3 through the contact 411. By means of the above structure, the first layer of solar panel 61 is ingeniously mounted on the upper end surface of the mounting shell 4, so that the solar panel 61 can be exposed to the sunlight to the largest extent, thereby collecting solar energy to the largest extent. Collection of sufficient solar energy means higher electric energy storage. At night or in a case of inadequate light, the solar mosquito killer lamp can still work normally.

In this embodiment, the mounting shell 4 is rotatably connected with a cover body 7; the cover body 7 is provided with a second accommodating slot 701; the solar panel 6 includes a second layer of solar panel 62; the second layer of solar panel 62 is arranged in the second accommodating slot 701; and the second layer of solar panel 62 is electrically connected to the circuit board 3 and the battery 5. By means of the above structure, the cover body is additionally provided with the second layer of solar panel 62, the solar energy absorption area is enlarged, and the efficiency of energy storage of the battery 5 is improved.

Figure 7:
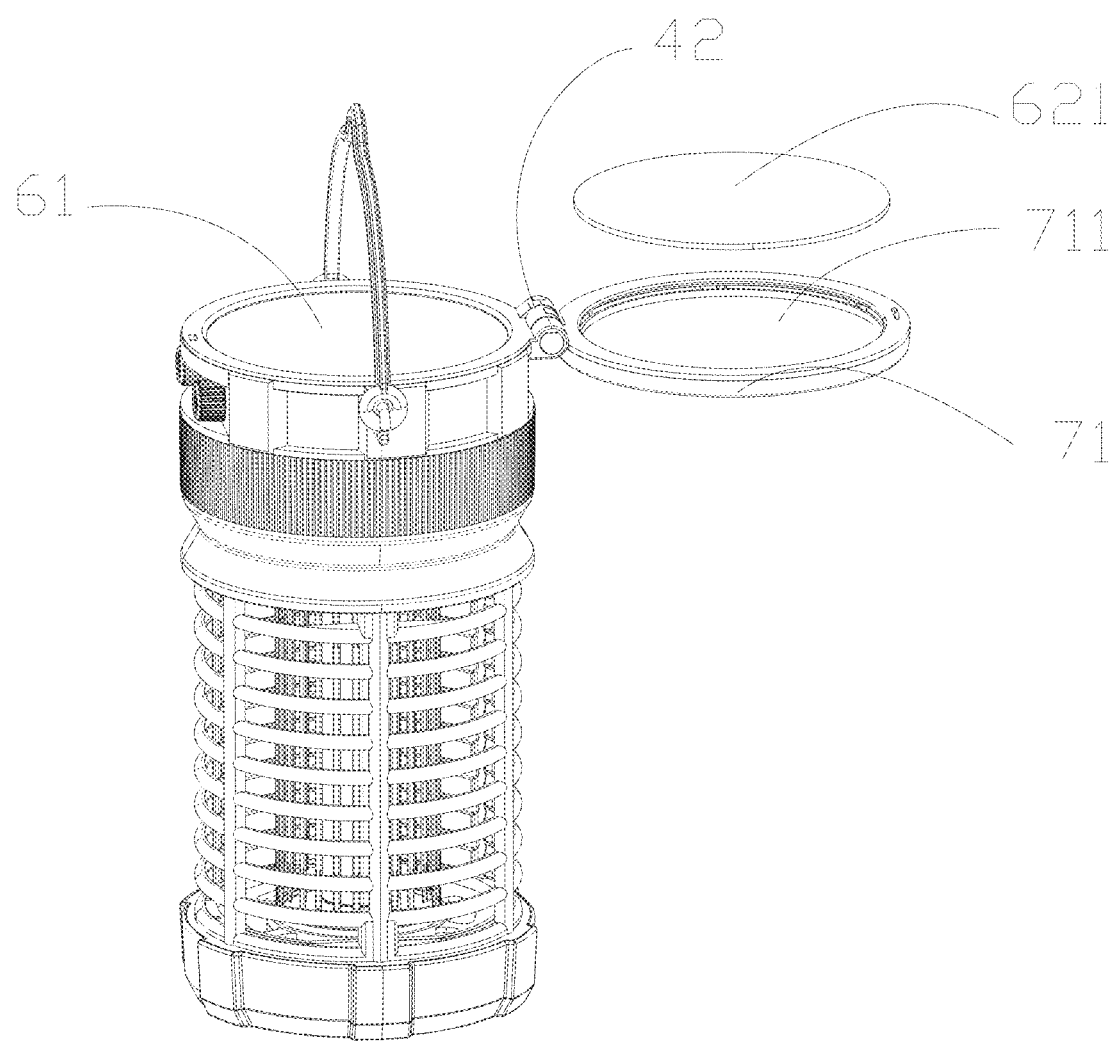
FIG. 7 is an exploded diagram of a solar panel according to one embodiment of a mosquito killer lamp of the present disclosure.

Referring to FIG. 7, the cover body 7 includes a first cover body 71; the first cover body 71 is flipped and rotated with the mounting shell 4 through a first rotating shaft mechanism 42; the first rotating shaft mechanism 42 is horizontally arranged between the first cover body 71 and the mounting shell 4, and the first cover body 71 is flipped up and down to cover the upper end face of the mounting shell 4 through the first rotating shaft mechanism 42; the first cover body 71 is provided with a third accommodating slot 711; the second layer of solar panel 62 includes a first solar panel 621; the first solar panel 621 is arranged in the third accommodating slot 711; and when the first cover body 71 is flipped to open, the first layer of solar panel 61 and the second layer of solar panel 62 can work simultaneously.

Figure 8:
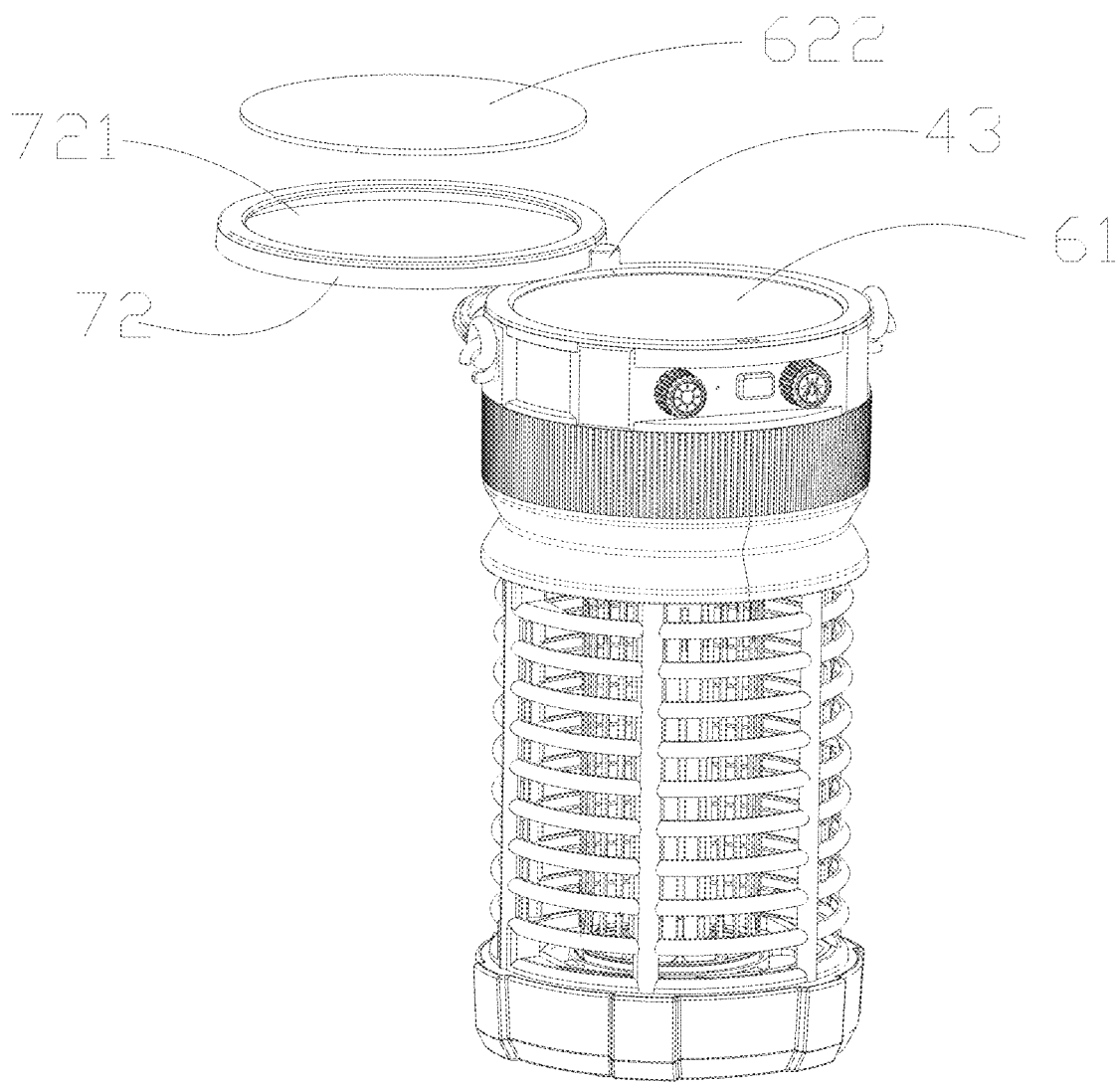
FIG. 8 is an exploded diagram of a solar panel according to another embodiment of a mosquito killer lamp of the present disclosure.

Referring to FIG. 8, the cover body 7 includes a second cover body 72; the second cover body 72 is rotatably connected to the mounting shell 4 through a second rotating shaft mechanism 43; the second rotating shaft mechanism 43 is vertically arranged between the second cover body 72 and the mounting shell 4, and the second cover body 72 slides left and right to cover the upper end face of the mounting shell 4 through the second rotating shaft mechanism 43; the second cover body 72 is provided with a fourth accommodating slot 721; the second layer of solar panel 62 includes a second solar panel 622; the second solar panel 622 is arranged in the fourth accommodating slot 721; and when the second cover body 72 slides to rotatably open, the first layer of solar panel 61 and the second layer of solar panel 62 can work simultaneously.

Figure 9:
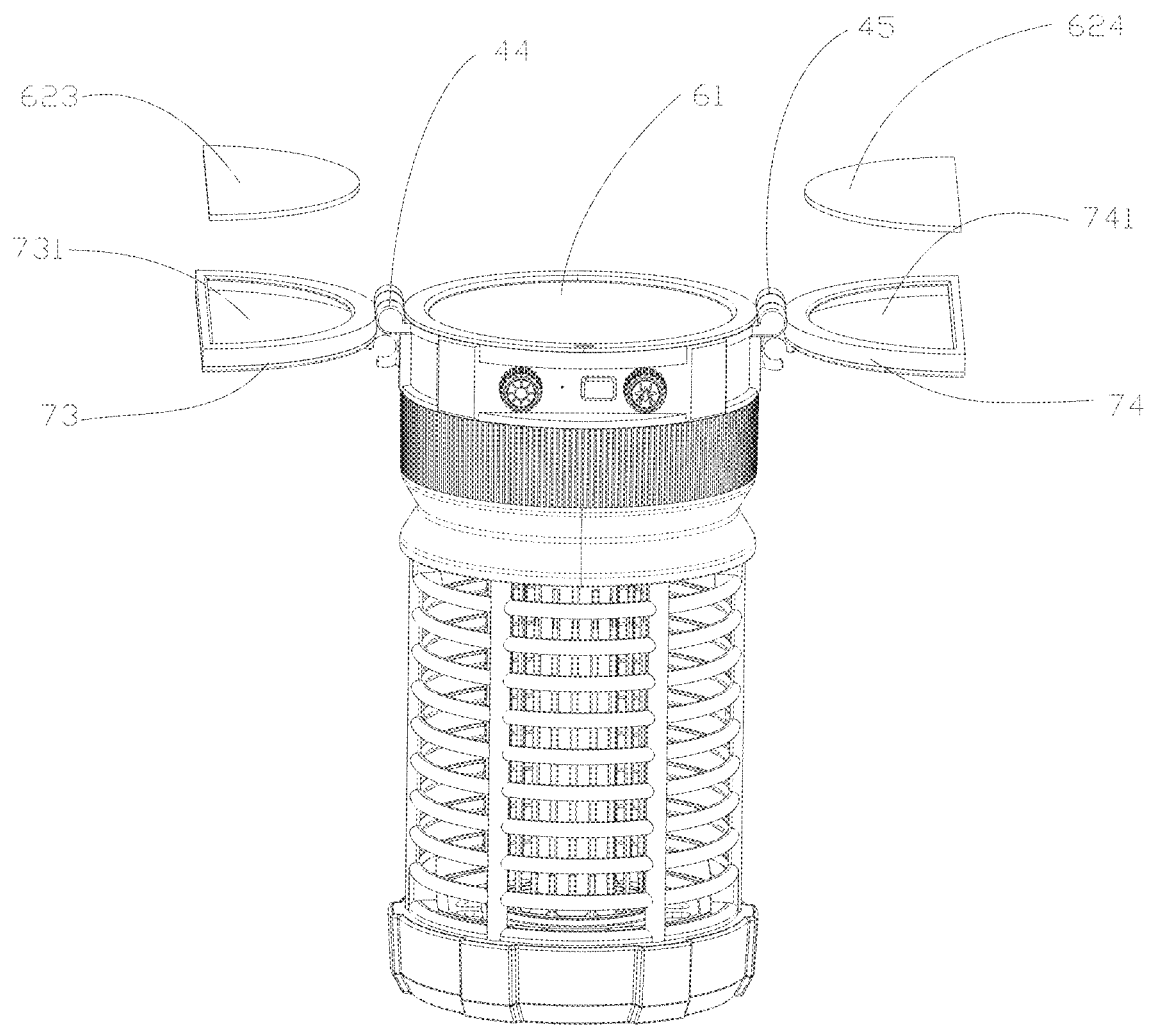
FIG. 9 is an exploded diagram of a solar panel according to another embodiment of a mosquito killer lamp of the present disclosure.

Referring to FIG. 9, the cover body 7 includes a third cover body 73 and a fourth cover body 74; the third cover body 73 and the fourth cover body 74 are respectively rotatably connected to the mounting shell 4 through a third rotating shaft mechanism 44 and a fourth rotating shaft mechanism 45; the third rotating shaft mechanism 44 is horizontally arranged between the third cover body 73 and the mounting shell 4, and the fourth rotating shaft mechanism 45 is horizontally arranged between the fourth cover body 74 and the mounting shell 4; the third cover body 73 and the fourth cover body 74 are respectively flipped and rotated up and down through the third rotating shaft mechanism 44 and the fourth rotating shaft mechanism 45, and jointly cover the upper end face of the mounting shell 4; the third cover body 73 is provided with a fifth accommodating slot 731; the second layer of solar panel 62 includes a third solar panel 623; the third solar panel 623 is arranged in the fifth accommodating slot 731; the fourth cover body 74 is provided with a sixth accommodating slot 741, and the second layer of solar panel 62 includes a fourth solar panel 624; the fourth solar panel 624 is arranged in the sixth accommodating slot 741; and when the third cover body 73 and the fourth cover body 74 are flipped to open, the first layer of solar panel 61 and the second layer of solar panel 62 can work simultaneously.

Figure 10:
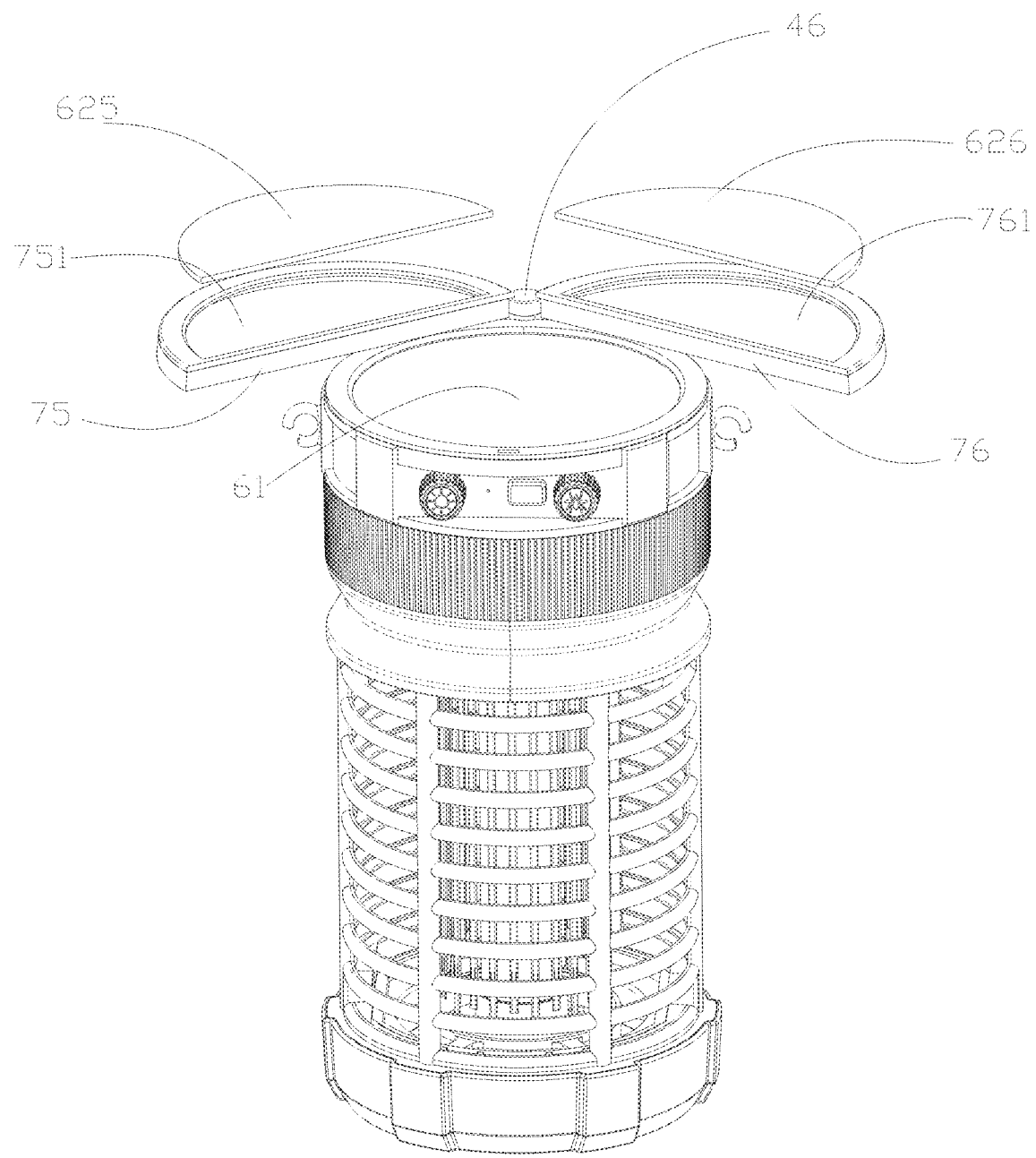
FIG. 10 is an exploded diagram of a solar panel according to another embodiment of a mosquito killer lamp of the present disclosure.

Referring to FIG. 10, the cover body includes a fifth cover body 75 and a sixth cover body 76; the fifth cover body 75 and the sixth cover body 76 are rotatably connected to the mounting shell 4 through a fifth rotating shaft mechanism 46; the fifth rotating shaft mechanism 46 is vertically arranged among the fifth cover body 75, the sixth cover body 76, and the mounting shell 4; the fifth cover body 75 and the sixth cover body 76 slide left and right through the fifth rotating shaft mechanism 46 and jointly cover the upper end face of the mounting shell 4; the fifth cover body 75 is provided with a seventh accommodating slot 751; the second layer of solar panel 62 includes a fifth solar panel 625; the fifth solar panel 625 is arranged in the seventh accommodating slot 751; the sixth cover body 76 is provided with an eighth accommodating slot 761, and the second layer of solar panel 62 includes a sixth solar panel 626; the sixth solar panel 626 is arranged in the eighth accommodating slot 761; and when the fifth cover body 75 and the sixth cover body 76 slide relatively to rotatably open, the first layer of solar panel 61 and the second layer of solar panel 62 can work simultaneously.

In this embodiment, the LED tube 11 includes a circuit board 12; the circuit board is provided with several LEDs 13; one end of the circuit board 12 is connected with an electrifying device 14; the electrifying device 14 is connected with a first end cover 15; a pin 16 is mounted on the first end cover 15; the pin 16 is electrically connected to the electrifying device 14; and the other end of the circuit board 12 is connected with a second end cover 17.

In this embodiment, the LED tube 11 further includes a scattering structure 18 and a transparent tube body 19; the scattering structure 18 and the transparent tube body 19 enclose the circuit board 12; one end of the scattering structure 18 is connected to the first end cover 15; the other end of the scattering structure 18 is connected to the second end cover 17; one end of the transparent tube body 19 is connected to the first end cover 15; and the other end of the transparent tube body 19 is connected to the second end cover 17. Further, the scattering structure 18 is a frosted material structure or a frosted glass material structure. By means of the above structure, the lighting effect of the LED tube can be improved, and the dazzling sensation is relieved, so that light for illumination is more comfortable and warmer.

In this embodiment, the several LEDs 13 are irregularly arranged on the circuit board 12; and the LEDs 13 include LEDs 13 emitting light with a central wavelength of 365 to 380 nm and LEDs 13 emitting light with a central wavelength of 380 to 400 nm. Preferably, the wavelength can be adjusted to 369 mm to kill mosquitoes and 395 mm to kill insects such as moths. By means of the above structure, light with different wavelengths can attract different insects and kill mosquitoes or moths separately. By combining light sources with different wavelengths, the attraction and insecticidal effect of the mosquito killer lamp can be increased, while unnecessary harm to beneficial insects can be avoided.

In this embodiment, the LED tube 11 is detachably connected to the mounting shell 4; the mounting shell 4 includes an upper shell 47 and a base 48; the upper shell 47 is provided with a first clamping slot 471 and a first fixing member 472; the first fixing member 472 is provided with a mounting hole 473; the pin 16 is detachably plugged into the mounting hole 473; the first end cover 15 is detachably plugged into the first clamping slot 471; the base is provided with a second clamping slot 474 and a second fixing member 475; and the second end cover 17 is detachably plugged into the second clamping slot 474 through the second fixing member 475.

In this embodiment, the high-voltage power grid 21 is arranged around the LED tube 11; one end of the high-voltage power grid 21 is connected to the upper shell 47, and the other end of the high-voltage power grid 21 is connected to the base 48; the base 48 is provided with a killed mosquito opening 481 and a bottom cover 482; the bottom cover 482 is detachably connected to the base 48; when the high-voltage power grid 21 kills mosquitoes, the mosquitoes killed by the high-voltage power grid 21 can enter and fall onto the bottom cover 482 through the killed mosquito opening 481. The high-voltage power grid 21 includes an inner grid 211 and an outer grid 212; the inner grid 211 and the outer grid 212 each include a plurality of gratings; and the gratings of the inner grid and the gratings of the outer grid are staggered. By means of the above structure, when in use, the mosquitoes that have been killed by the high-voltage power grid 21 will fall into the bottom cover 482 from the high-voltage power grid 21, so as to prevent the mosquitoes from directly falling onto the ground. To clean mosquitoes, the bottom cover 482 can be removed from the base 48 to clean the mosquitoes in the bottom cover 482, which is easy to clean and convenient to use. This solves the technical problem that when the traditional mosquito killer lamp is used, mosquito bodies fall onto the ground and are difficult to intensively clean.

Figure 2:
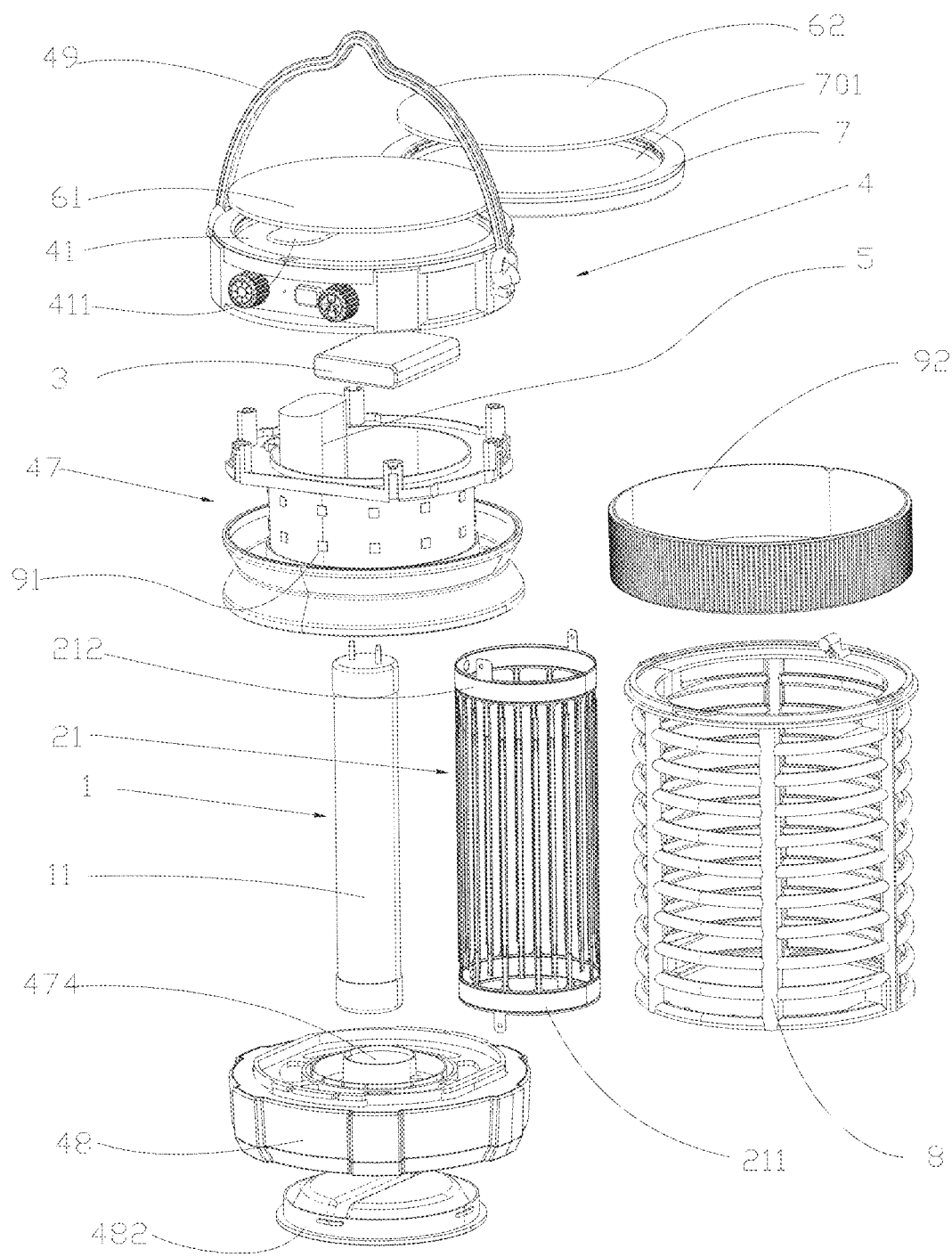
FIG. 2 is an exploded diagram of a mosquito killer lamp of the present disclosure.
Figure 3:
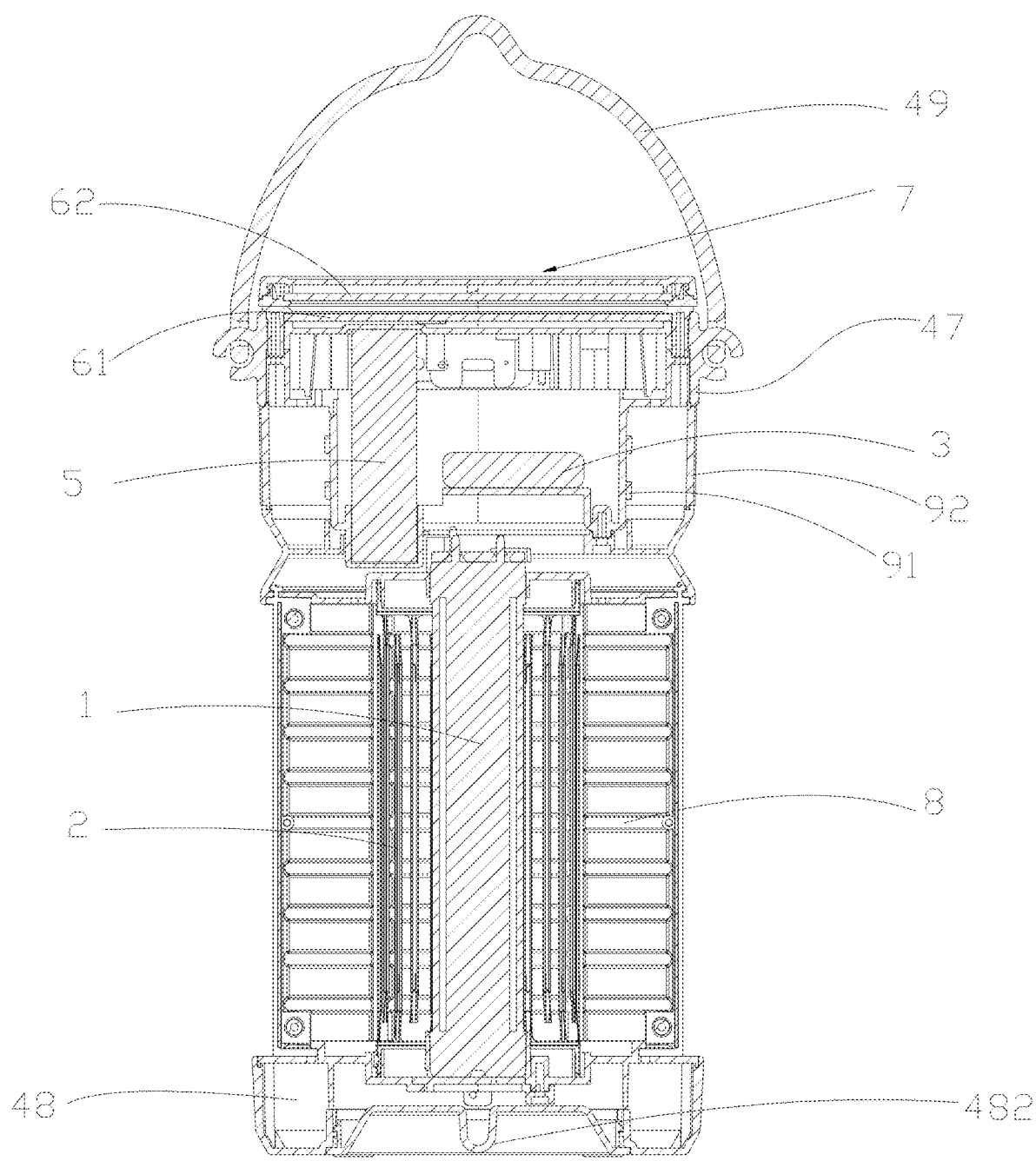
FIG. 3 is a sectional diagram of a mosquito killer lamp of the present disclosure.
Figure 4:
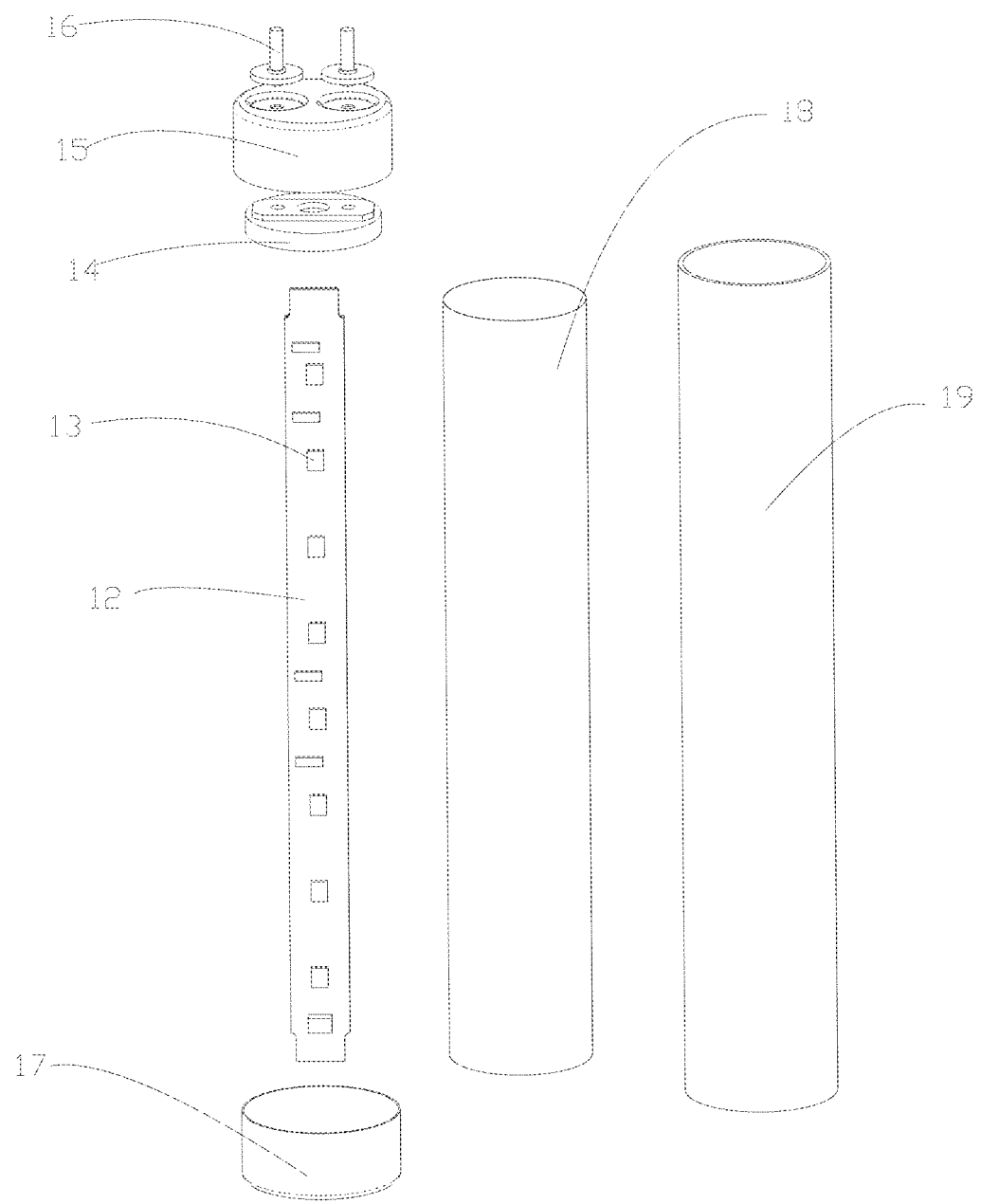
FIG. 4 is an exploded diagram of an LED tube of a mosquito killer lamp of the present disclosure.
Figure 5:
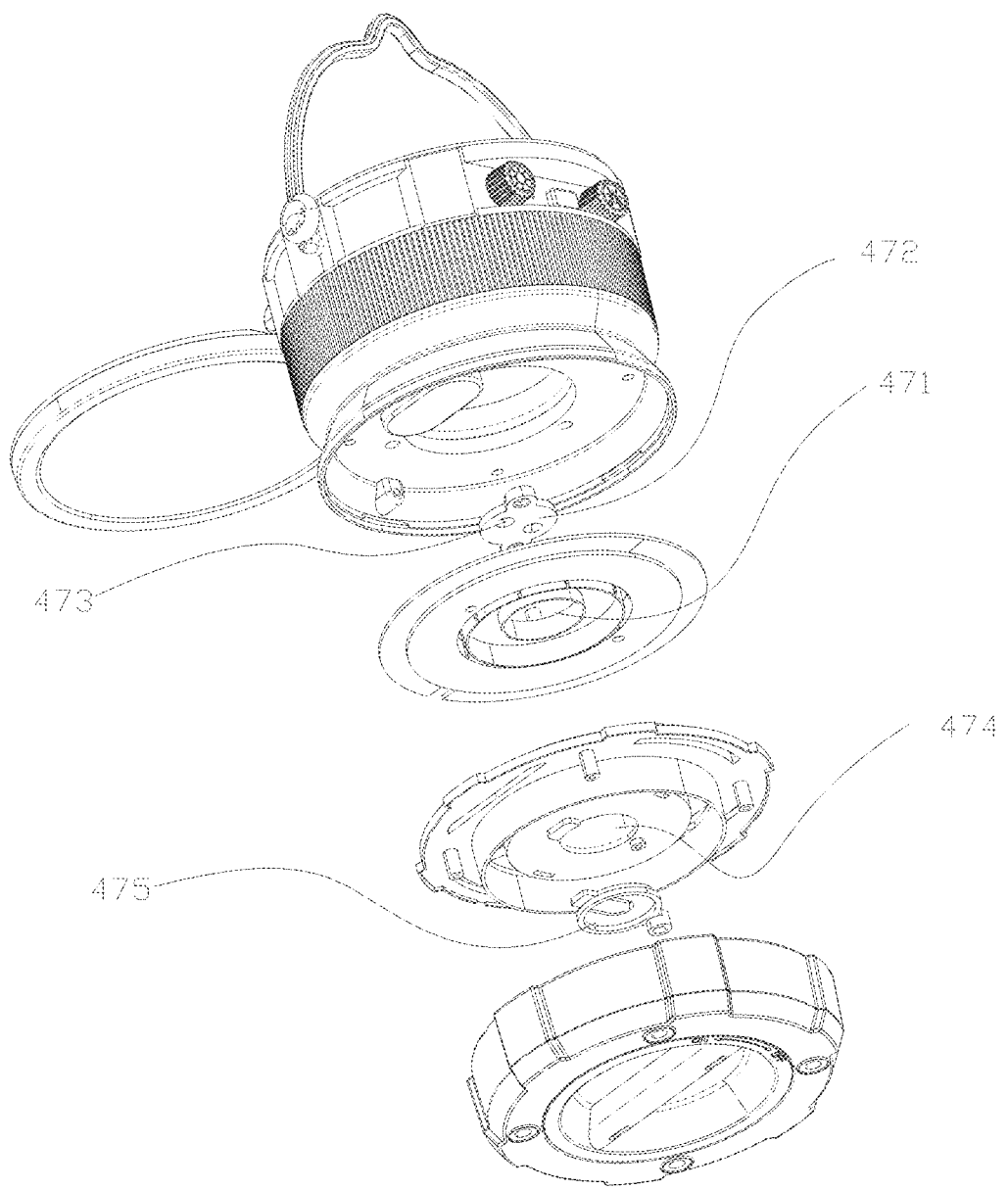
FIG. 5 is an exploded diagram of an upper shell and a base of a mosquito killer lamp of the present disclosure.
Figure 6:
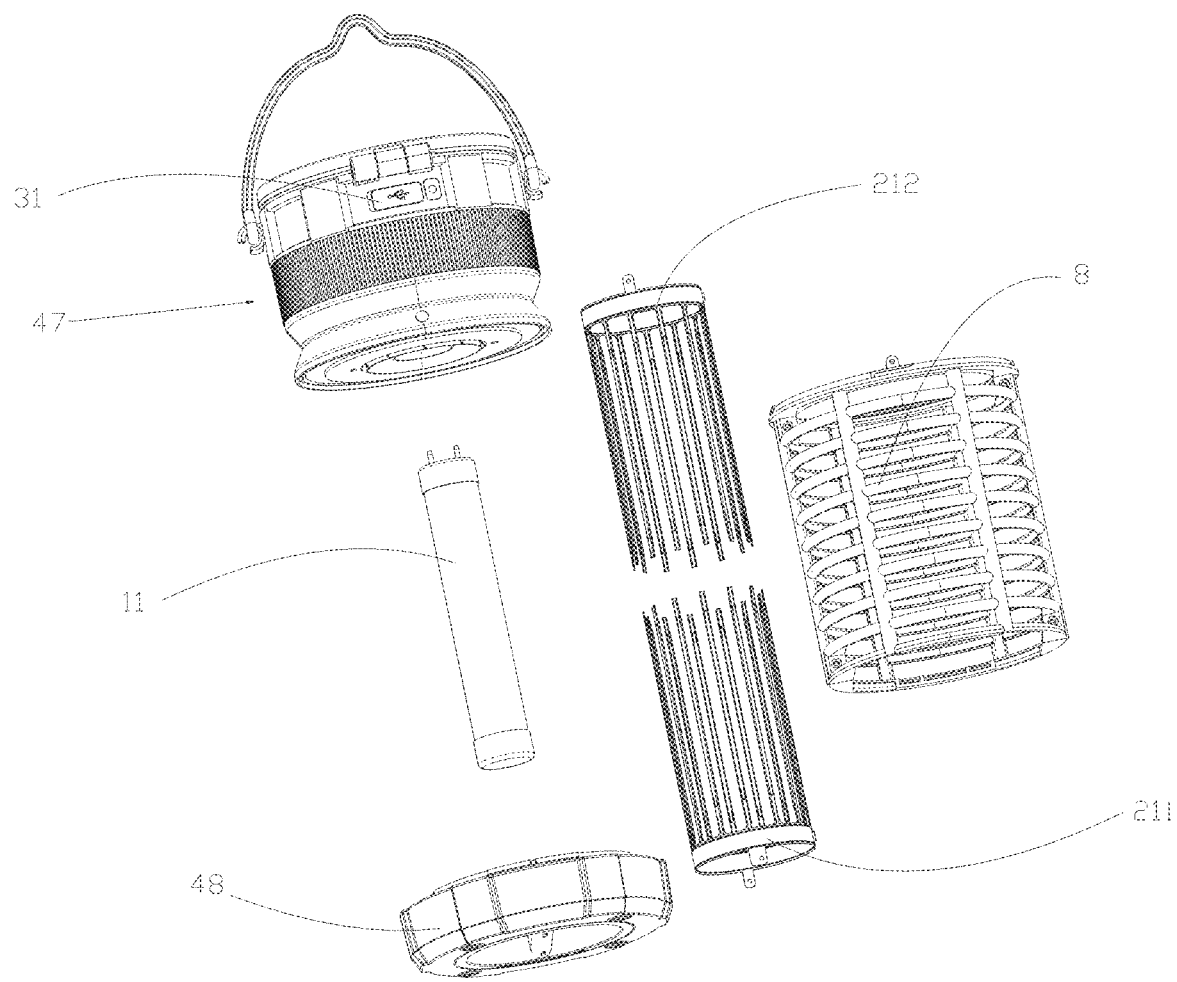
FIG. 6 is another exploded diagram of a mosquito killer lamp of the present disclosure.

In this embodiment, referring to FIG. 2 and FIG. 3, the solar mosquito killer lamp further includes a second light-emitting unit 9; the second light-emitting unit 9 includes several LEDs 91; the LEDs 91 are uniformly arranged around a periphery of the upper shell 47; the upper shell 47 is further provided with a transparent cover body 92; the transparent cover body 92 is arranged around an outside of the LEDs 91; and the transparent cover body 92 connects the upper shell 47 and covers the LEDs 91. By means of the above structure, the LEDs 91 can emit light of illumination through the transparent cover body 92, which can be used for night lighting. Referring to FIG. 2, the transparent cover body 92 is an annular structure, specially, the LEDs 91 are arranged in at least one circle, and the annular structure of the transparent cover body 92 has a cylindrical sidewall.

In this embodiment, the upper shell 47 is provided with an accommodating cavity 475; and the circuit board 3 and the battery 5 are both arranged in the accommodating cavity 476.

In this embodiment, the solar mosquito killer lamp further includes a second light-emitting unit 9; the second light-emitting unit 9 includes several LEDs 91; the LEDs 91 are uniformly arranged around a periphery of the upper shell 47; the upper shell 47 is further provided with a transparent cover body 92; and the transparent cover body 92 covers the LEDs. By means of the above structure, the LEDs can emit light of illumination through the transparent cover body, which can be used for night lighting.

In this embodiment, a first stepless adjustment knob 477, a second stepless adjustment knob 478, and a switch 479 are arranged on an outer surface of the upper shell 47; the first stepless adjustment knob 477 is configured to adjust brightness of the LEDs; the second stepless adjustment knob 478 is configured to adjust a wavelength of the LED tube 11; and the switch 479 is configured to control the mosquito killer lamp to be turned on or turned off. By means of the above structure, a user can perform stepless adjustment on the brightness according to a corresponding environment. In a dark environment, the user can turn on the LEDs 91 to provide ambient lighting. Since users have different needs for killing mosquitoes, the second stepless adjustment knob can adjust the wavelength to achieve precise killing of different kinds of mosquitoes.

In this embodiment, the upper shell 47 is further provided with a charging port 31; and the charging port 31 is electrically connected to the circuit board 3 and is configured to connect an external power supply. The charging port may adopt a USB interface or a Type-C interface. By means of the above structure, the mosquito killer lamp can be plugged to an external power supply for charging while it is charged using the solar energy.

In this embodiment, the mosquito killer lamp further includes a handle portion 49. The handle portion 49 is rotatably connected to the mounting shell 4, and the handle portion is configured to carry the mosquito killer lamp. By means of the above structure, it is convenient for a user to carry the mosquito killer lamp due to the handle portion, which improves the user experience.

It should be finally noted that the above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A mosquito killer lamp, comprising:
a first light emitting unit configured to emit light luring mosquitoes, wherein the first light emitting unit comprises a light circuit board, a plurality of LEDs disposed on the light circuit board, and a tube body, the light circuit board is located in the tube body, wherein the LEDs of the first light emitting unit comprises a plurality of first LEDs emitting light with wavelengths ranging from 365 to 380 nm and a plurality of second LEDs emitting light with wavelengths ranging from 380 to 400 nm;
a mosquito killer unit comprising a high-voltage power grid, wherein the high-voltage power grid is configured to kill, under a high voltage, mosquitoes lured by the first light emitting unit;
a circuit board electrically connected to the first light emitting unit and the mosquito killer unit and configured to supply power to the first light emitting unit and the mosquito killer unit;
a mounting shell provided with a battery; wherein the battery is electrically connected to the circuit board; the first light emitting unit and the mosquito killer unit are connected to the mounting shell, the mounting shell comprises an upper shell and a base; and
a second light emitting unit arranged above the first light emitting unit, wherein the second light emitting unit comprises a plurality of LEDs disposed around an outside of the upper shell; the upper shell is further provided with an annular transparent cover body; the transparent cover body is arranged around an outside of the plurality of LEDs of the second light emitting unit, the transparent cover body is connected to the upper shell and covers the plurality of LEDs of the second light emitting unit, and the plurality of LEDs of the second light emitting unit are configured to emit light passing through the transparent cover body.

2. The mosquito killer lamp according to claim 1, wherein a first stepless adjustment knob, a second stepless adjustment knob, and a switch are arranged on an outer surface of the upper shell; the first stepless adjustment knob is configured to adjust brightness of the plurality of LEDs of the second light emitting unit; the second stepless adjustment knob is configured to adjust a wavelength of the first light emitting unit; and the switch is configured to control the mosquito killer lamp to be turned on or turned off; the first stepless adjustment knob is a rotary knob installed on the mounting shell; and the second stepless adjustment knob is a rotary knob installed on the mounting shell.

3. The mosquito killer lamp according to claim 2, wherein the upper shell is further provided with a charging port; the charging port is electrically connected to the circuit board and is configured to connect an external power supply, and the charging port is a Type-C interface.

4. The mosquito killer lamp according to claim 3, wherein the mosquito killer lamp further comprises a handle portion; the handle portion is rotatably connected to the mounting shell; and the handle portion is configured to carry the mosquito killer lamp.

5. The mosquito killer lamp according to claim 1, further comprising a solar panel module connected to the mounting shell and electrically connected to the circuit board and the battery,
wherein the solar panel module comprises a first solar panel; and the first solar panel is arranged on the mounting shell, a first accommodating slot is formed on the mounting shell; the first solar panel is arranged in the first accommodating slot; and the first solar panel is electrically connected to the battery and the circuit board through an electrical contact; and
wherein the mounting shell is connected with a cover body; the cover body is provided with a second accommodating slot; the solar panel module comprises a second solar panel; the second solar panel is arranged in the second accommodating slot; and the second solar panel is electrically connected to the circuit board and the battery.

6. The mosquito killer lamp according to claim 5, wherein the first solar panel is disposed on an upper surface of the mounting shell, the cover body is rotatably connected with the mounting shell through a rotating shaft mechanism; the rotating shaft mechanism is horizontally arranged between the cover body and the mounting shell, and the cover body is flipped up and down to cover the upper surface of the mounting shell through the rotating shaft mechanism; and when the cover body is flipped to open, the first solar panel and the second solar panel work simultaneously.

7. The mosquito killer lamp according to claim 1, wherein the first light emitting unit is connected between the upper shell and the base, the first light emitting unit comprises a light circuit board, a plurality of LEDs disposed on the light circuit board, and a tube body receiving the light circuit board, wherein the high-voltage power grid is disposed around an outside of the first light emitting unit and connected between the upper shell and the base.

8. The mosquito killer lamp according to claim 7, wherein the first light emitting unit further comprises a scattering layer disposed on the tube body, a first end cover disposed on an end of the tube body, a second end cover disposed on the other end of the tube body, at least one pin mounted on the first end cover, and an electrifying device disposed on the first end cover, the light circuit board is located in the tube body, the two ends of the light circuit board are connected to the second end cover and the electrifying device, the at least one pin is electrically connected to the electrifying device so as to electrically connect the light circuit board.

9. The mosquito killer lamp according to claim 1, wherein the plurality of LEDs of the second light emitting unit are arranged in at least one circle, and the annular transparent cover body comprises a cylindrical sidewall.

10. A mosquito killer lamp, comprising:
a first light emitting unit configured to emit light luring mosquitoes, the first light emitting unit comprising a light circuit board, a plurality of LEDs disposed on the light circuit board;
a mosquito killer unit comprising a high-voltage power grid, wherein the high-voltage power grid is configured to kill, under a high voltage, mosquitoes lured by the first light emitting unit;
a circuit board electrically connected to the first light emitting unit and the mosquito killer unit and configured to supply power to the first light emitting unit and the mosquito killer unit;
a mounting shell provided with a battery; the battery being electrically connected to the circuit board; the first light emitting unit and the mosquito killer unit being connected to the mounting shell; and
a second light emitting unit connected to the mounting shell, the second light emitting unit comprising a plurality of LEDs, wherein the second light emitting unit is arranged above the first light emitting unit, and the mounting shell comprises an annular transparent cover body enclosing the second light emitting unit therein;
wherein a first stepless adjustment rotary knob is arranged on an outer surface of the mounting shell, the first stepless adjustment rotary knob is configured to adjust brightness of the LEDs of the second light emitting unit, and a second stepless adjustment rotary knob is arranged on an outer surface of the mounting shell; and the second stepless adjustment rotary knob is configured to adjust a wavelength of the LEDs of the first light emitting unit.

11. The mosquito killer lamp according to claim 10, further comprising a solar panel module connected to the mounting shell and electrically connected to the circuit board and the battery,
wherein the solar panel module comprises a first solar panel; and the first solar panel is arranged on the mounting shell, and the first solar panel is electrically connected to the battery and the circuit board through an electrical contact; and
wherein the mounting shell is rotatably connected with a cover body, the solar panel module comprises a second solar panel, the second solar panel is arranged on the cover body, and the second solar panel is electrically connected to the circuit board and the battery.

12. A killer lamp for mosquito or insect, comprising:
a first light emitting unit configured to emit light luring mosquitoes or insect, wherein the first light emitting unit comprises a light circuit board, a plurality of LEDs disposed on the light circuit board, and a tube body, the light circuit board is located in the tube body, wherein the LEDs of the first light emitting unit comprises a plurality of first LEDs emitting light with wavelengths ranging from 365 to 380 nm and a plurality of second LEDs emitting light with a wavelength of 395 nm;
a killer unit comprising a high-voltage power grid, wherein the high-voltage power grid is configured to kill, under a high voltage, mosquitoes or insect lured by the first light emitting unit;
a circuit board electrically connected to the first light emitting unit and the killer unit and configured to supply power to the first light emitting unit and the killer unit;
a mounting shell provided with a battery; wherein the battery is electrically connected to the circuit board; the first light emitting unit and the killer unit are connected to the mounting shell, the mounting shell comprises an upper shell and a base; and
a second light emitting unit arranged above the first light emitting unit, wherein the second light emitting unit comprises a plurality of LEDs disposed around an outside of the upper shell; the upper shell is further provided with an annular transparent cover body; the transparent cover body is arranged around an outside of the plurality of LEDs of the second light emitting unit, the transparent cover body is connected to the upper shell and covers the plurality of LEDs of the second light emitting unit, and the plurality of LEDs of the second light emitting unit are configured to emit light passing through the transparent cover body.

13. The killer lamp according to claim 12, wherein the plurality of first LEDs emitting light have a wavelength of 369 nm.

* * * * *